(12) United States Patent
Hwang et al.

(10) Patent No.: US 7,539,102 B2
(45) Date of Patent: May 26, 2009

(54) METHOD OF AND APPARATUS FOR RECORDING DATA ON WRITE-ONCE DISC, METHOD OF AND APPARATUS FOR REPRODUCING DATA FROM WRITE-ONCE DISC, AND WRITE-ONCE DISC THEREFOR

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/773,137

(22) Filed: Jul. 3, 2007

(65) Prior Publication Data

US 2007/0268804 A1    Nov. 22, 2007

Related U.S. Application Data

(63) Continuation of application No. 11/018,225, filed on Dec. 22, 2004.

(30) Foreign Application Priority Data

Dec. 24, 2003  (KR) ............... 2003-96223
Jan. 31, 2004  (KR) ............... 2004-6471

(51) Int. Cl.
*G11B 11/00* (2006.01)
(52) U.S. Cl. ............... 369/53.17; 369/47.14
(58) Field of Classification Search ............ None
See application file for complete search history.

(56) References Cited

U.S. PATENT DOCUMENTS 7,051,054 B1 * 5/2006 Lee et al. ............ 707/205
7,397,738 B2 * 7/2008 Hwang et al. ........ 369/47.14
2003/0193859 A1  10/2003 Mitsuda et al.

(Continued)

FOREIGN PATENT DOCUMENTS

JP      9-139022      5/1997

(Continued)

OTHER PUBLICATIONS

U.S. Appl. No. 11/018,225, filed Dec. 2004, Sung-hee Hwang et al., Samsung Electronics Co., Ltd.

(Continued)

*Primary Examiner*—Paul Huber
(74) *Attorney, Agent, or Firm*—Stein, McEwen & Bui, LLP

(57) ABSTRACT

A method and apparatus recording and/or reproducing data on/from a write-once disc, and a write-once disc therefor, the write-once disc having at least one recording layer including: a plurality of update areas in which predetermined updated information is recorded; and at least one access information area in which access information indicating an update area in which final recorded updated information is recorded. Reducing access time for reading the updated information using a location of predetermined updated information. Also, when a plurality of update areas for writing updated information required to use the write-once disc exist, a recording apparatus or a reproducing apparatus can quickly and easily determine an update area in which final updated information is recorded among the plurality of update areas.

20 Claims, 9 Drawing Sheets

U.S. PATENT DOCUMENTS

| | | |
|---|---|---|
| 2003/0217279 A1 | 11/2003 | Fuchigami et al. |
| 2004/0185216 A1 | 9/2004 | Hwang et al. |
| 2005/0083767 A1 | 4/2005 | Terada et al. |

FOREIGN PATENT DOCUMENTS

| | | |
|---|---|---|
| JP | 2003-317387 | 11/2003 |
| JP | 2003-333522 | 11/2003 |
| RU | 2006 106 718 | 1/2006 |
| WO | WO 01/93009 A2 | 12/2001 |
| WO | WO 2004/049332 | 6/2004 |

OTHER PUBLICATIONS

Russian Office Action dated Oct. 3, 2007 corresponding to Russian Patent Application No. 2006122537.

Office Action issued in Chinese Patent Application No. 2004-80038678.3 on Oct. 10, 2008.

* cited by examiner

METHOD OF AND APPARATUS FOR RECORDING DATA ON WRITE-ONCE DISC, METHOD OF AND APPARATUS FOR REPRODUCING DATA FROM WRITE-ONCE DISC, AND WRITE-ONCE DISC THEREFOR

CROSS-REFERENCE TO RELATED APPLICATIONS

This application is a continuation of U.S. application Ser. No. 11/018,225, filed Dec. 22, 2004, now pending, which claims the priority of Korean Patent Applications No. 2003-96223, filed on Dec. 24, 2003 and No. 2004-6471, filed on Jan. 31, 2004, in the Korean Intellectual Property Office, the disclosures of which are incorporated herein by reference.

BACKGROUND OF THE INVENTION

1. Field of the Invention

The present invention relates to a method and apparatus recording and/or reproducing data on or from a write-once disc, and more particularly, to a method and apparatus recording access information on the write-once disc to access more quickly information required to use the write-once disc and a write-once disc used with the above method and apparatus.

2. Description of the Related Art

New information can be repeatedly recorded on a rewritable disc on which information has already been recorded. However, when new information is recorded on a write-once disc, since information that has already been recorded can be neither erased nor repeatedly recorded in a location in which the information was recorded, a new location must be allocated in order to update the information already recorded.

Generally, only information which has finally been updated is meaningful. Therefore, to read the information which has finally been updated, an update area is allocated to a data area, and a disc drive detects the information which has finally been updated by searching for the update area in which updated information is recorded. When much information is recorded in the updated area, it takes a lot of time to detect desired information.

On a write-once disc for which defect management by a drive is performed, areas to record information for managing defects generated while the write-once disc is being used and information indicating a recording status of the write-once disc exist. Unlike a rewritable disc, according to a characteristic of the write-once disc, since updated information cannot be repeatedly recorded in a location in which existing information has been recorded when an update of the defect management information is required, the updated information must be recorded in an empty location. Accordingly, a relatively wide update area is necessary. In general, the update area is allocated to a lead-in area or a lead-out area. However, sometimes, the update area may be allocated to a data area in order to increase an update count according to a user's designation.

When final updated information required to use the write-once disc is recorded in the update area allocated to the data area, and when information indicating that the update area is allocated to the data area and information indicating a location of the update area are included in the final updated information, the final updated information or a location in which the final updated information is recorded cannot be detected, even if the entire update area allocated to the lead-in area or the lead-out area is sought.

SUMMARY OF THE INVENTION

According to an aspect of the present invention, there is provided a write-once disc having recorded thereon information having a data structure by which an access time for reading updated information required to use the write-once disc can be reduced.

According to another aspect of the present invention, there is also provided a data recording method and apparatus by which an access time for reading updated information required to use a write-once disc can be reduced.

According to another aspect of the present invention, there is provided a data reproducing method and apparatus by which an access time for reading updated information required to use a write-once disc can be reduced.

According to an aspect of the present invention, there is provided a write-once disc having at least one recording layer, the disc including: a plurality of update areas in which predetermined updated information is recorded; and at least one access information area in which access information is recorded, the access information indicating an update area in which final updated information is recorded.

According to another aspect of the present invention, there is provided a method of recording data on a write-once disc, the method including: recording predetermined updated information in one of a plurality of update areas allocated to the write-once disc; and recording access information indicating an update area in which final updated information is recorded in at least one access information area allocated to the write-once disc.

According to another aspect of the present invention, there is provided an apparatus for recording data on a write-once disc, the apparatus including: a write/read unit writing or reading information on or from the write-once disc; and a controller controlling the write/read unit to record predetermined updated information in one of a plurality of update areas allocated to the write-once disc and record access information indicating an update area in which final updated information is recorded in at least one access information area allocated to the write-once disc.

According to another aspect of the present invention, there is provided a method of reproducing a write-once disc, the method including: obtaining final updated access information from at least one access information area allocated to the write-once disc; and obtaining information indicating an update area in which the final updated access information is recorded among a plurality of update areas allocated to the write-once disc from the final updated access information.

According to another aspect of the present invention, there is provided an apparatus for reproducing a write-once disc, the apparatus including: a reader reading data recorded on the write-once disc; and a controller controlling the reader to obtain final updated access information from at least one access information area allocated to the write-once disc and obtaining information indicating an update area in which the final updated access information is recorded among a plurality of update areas allocated to the write-once disc from the final updated access information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent and more readily appreciated from the following description of the embodiments, taken in conjunction with the accompanying drawings of which.

DETAILED DESCRIPTION OF THE EMBODIMENTS

Figure 1A:
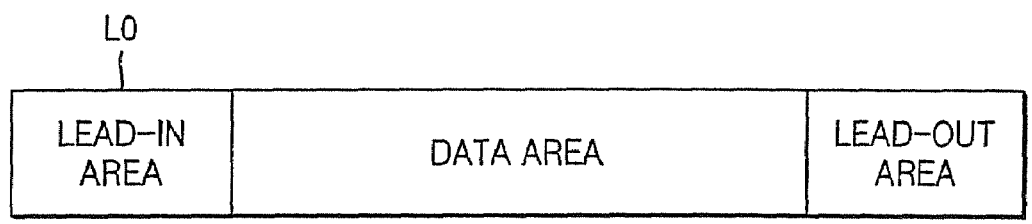
FIGS. 1A and 1B are structures of a write-once disc according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1B:
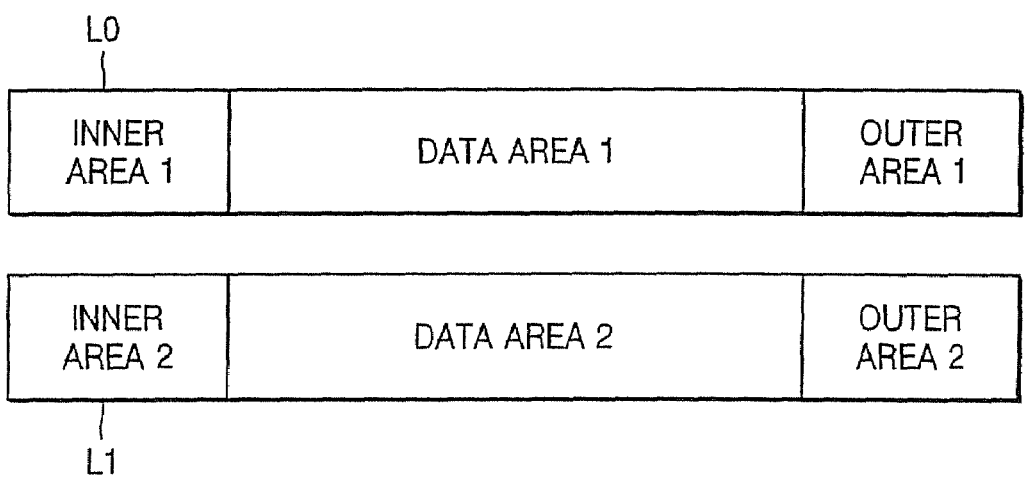

FIGS. 1A and 1B are structures of a write-once disc according to an embodiment of the present invention. FIG. 1A is a structure of a write-once disc having a single recording layer, and FIG. 1B is a structure of a write-once disc having a double recording layer.

The write-once disc having a single recording layer includes a lead-in area, a data area, and a lead-out area arranged from the inner circumference to the outer circumference.

Each of a first recording layer L0 and a second recording layer L1 of the write-once disc having a double recording layer includes a lead-in area, a data area, and a lead-out area arranged from the inner circumference to the outer circumference.

Figure 2:
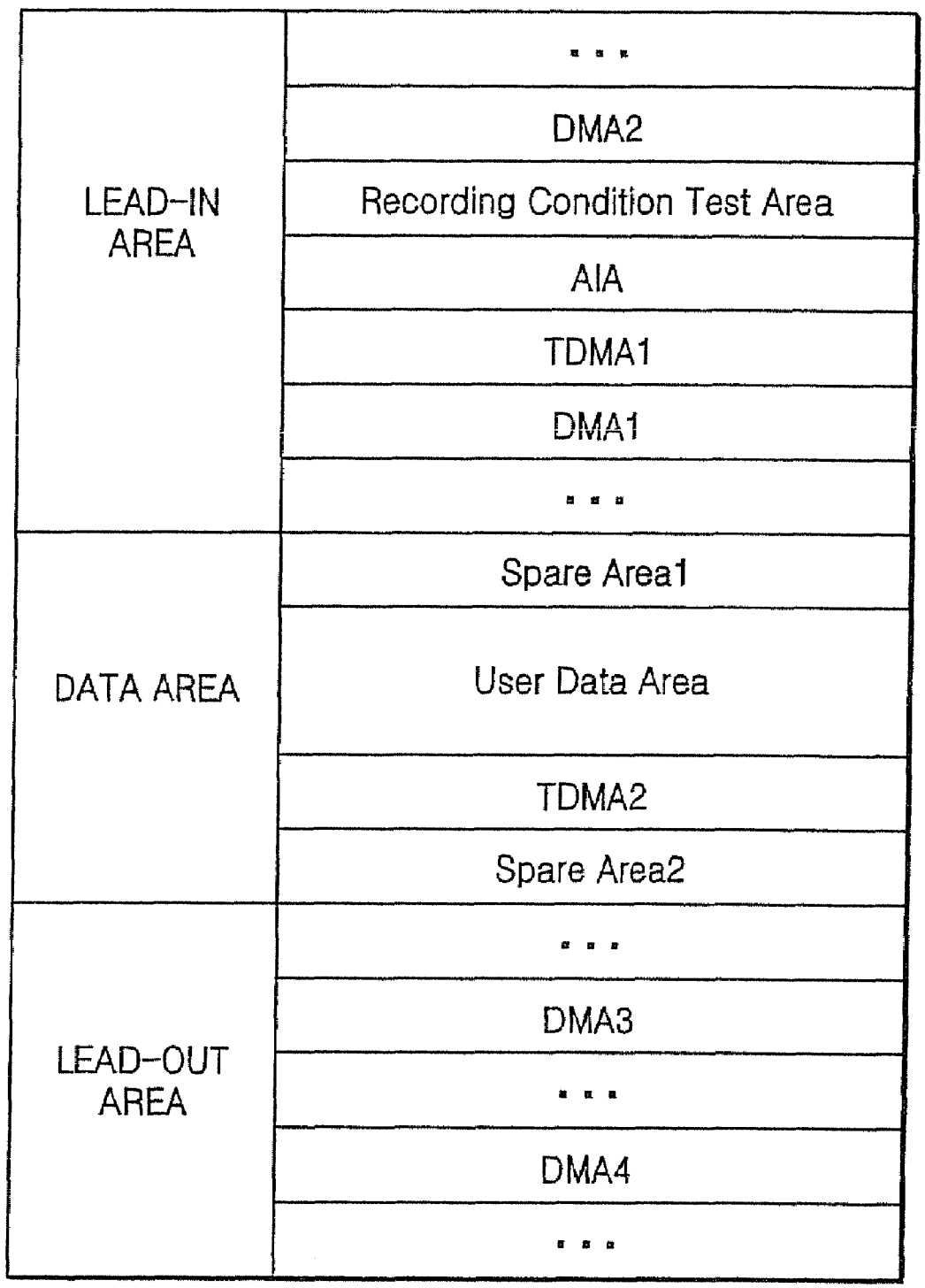
FIG. 2 is a detailed structure of a write-once disc having a single recording layer according to an embodiment of the present invention.

FIG. 2 is a detailed structure of the write-once disc having a single recording layer according to an embodiment of the present invention. Referring to FIG. 2, the lead-in area includes a first disc management area (DMA1), a second disc management area (DMA2), a first temporary disc management area (TDMA1), an access information area (AIA), and a recording condition test area. The lead-out area includes a third disc management area (DMA3) and a fourth disc management area (DMA4). Also, the lead-out area may further include at least one of a temporary defect management area, a recording condition test area, and an AIA. That is, there may be at least one of the AIA, the DMA, the TDMA, and the recording condition test area in at least one of the lead-in areas and/or the lead-out areas.

Figure 3A:
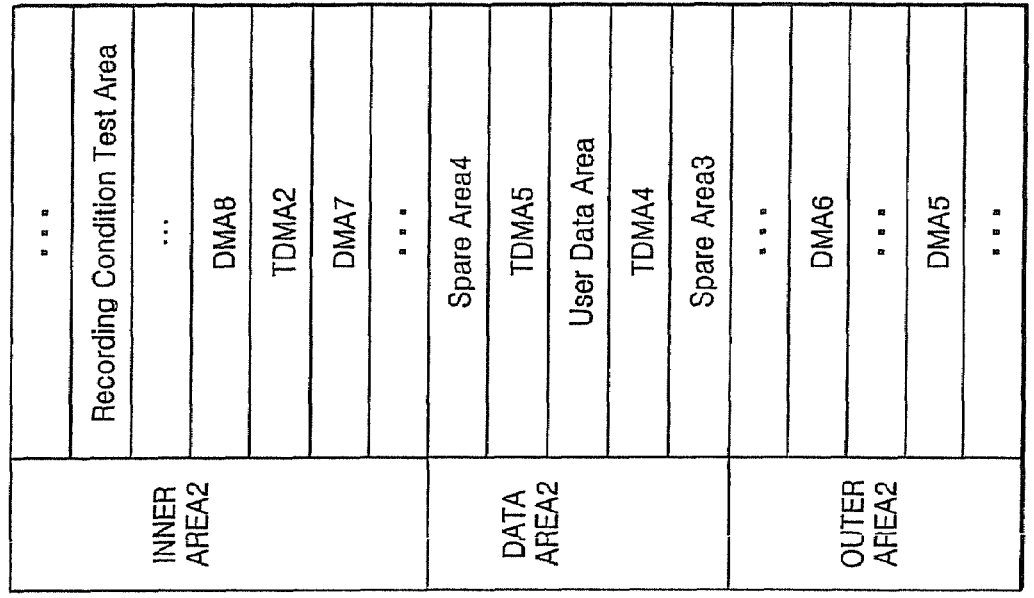
FIGS. 3A and 3B are detailed structures of a write-once disc having a double recording layer according to an embodiment of the present invention.
Figure 3B:
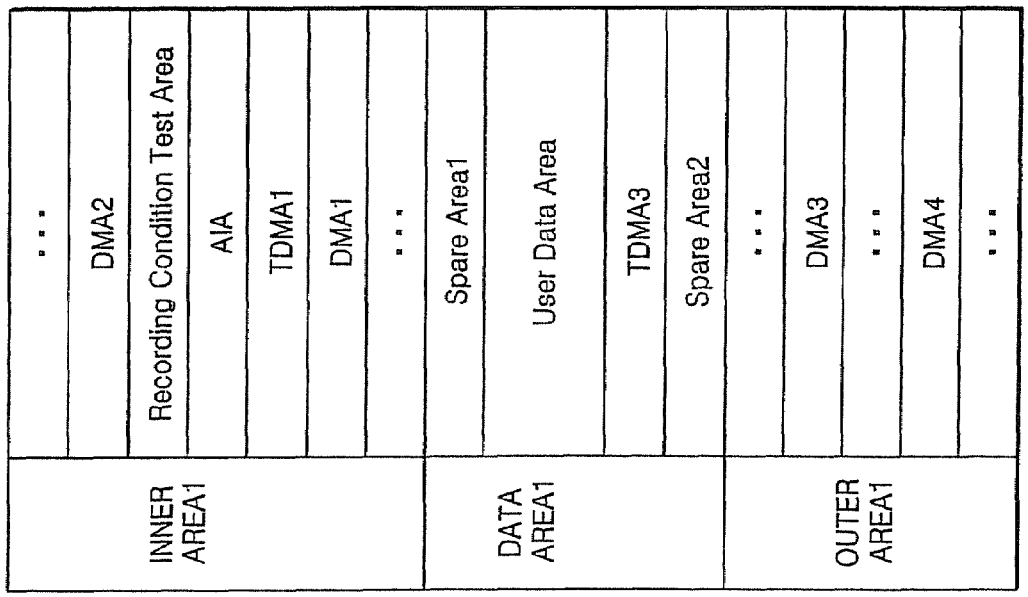

FIGS. 3A and 3B are detailed structures of the write-once disc having a double recording layer according to an embodiment of the present invention. FIG. 3A is a structure of a first recording layer L0, and FIG. 3B is a structure of a second recording layer L1. The structure of the first recording layer L0 shown in FIG. 3A is identical to the structure of the write-once disc having a single recording layer shown in FIG. 2. The structure of the second recording layer L1 shown in FIG. 3B is similar to the structure of the first recording layer L0. However, in the structure of the second recording layer L1, the AIA is not allocated to a second inner area, and two TDMAs are allocated to a second data area.

The write-once disc having a double recording layer includes five TDMAs, a TDMA1 through a TDMA5. Locations and sizes of the TDMA1 and TDMA2 are well known to recording apparatuses and/or reproducing apparatuses. However, a TDMA3, a TDMA4, and the TDMA5 are allocated to data areas by a user or a recording apparatus and/or a reproducing apparatus when a disc initialization is performed to use the write-once disc having a double recording layer. When a temporary disc management structure (TDMS) is recorded from the TDMA1, a temporary disc defect structure (TDDS) including sizes and locations of TDMAs allocated to the data areas is recorded in the TDMA1.

Figure 4A:
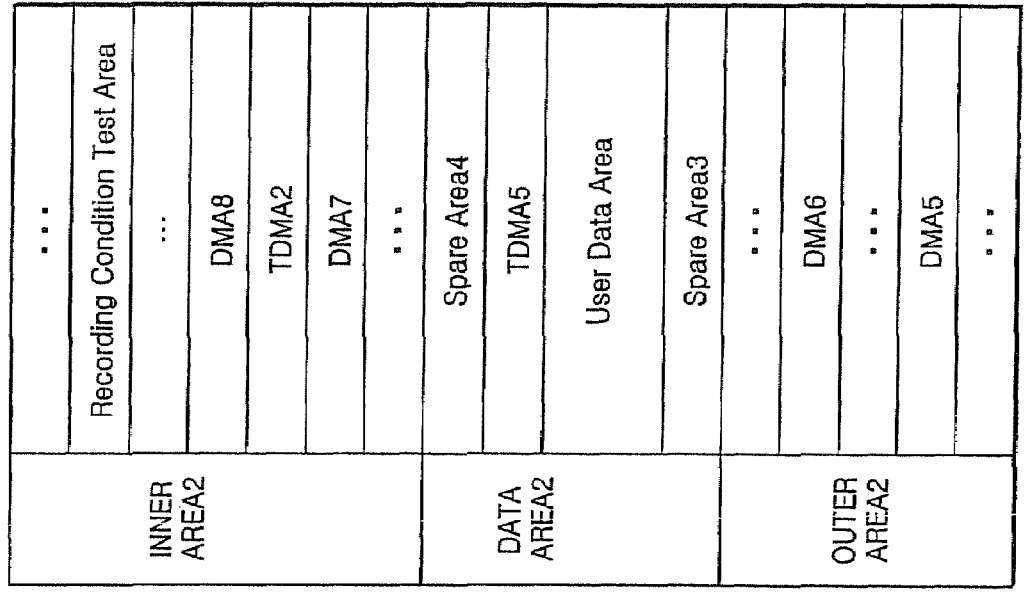
FIGS. 4A and 4B are detailed structures of a write-once disc having a double recording layer according to another embodiment of the present invention.
Figure 4B:
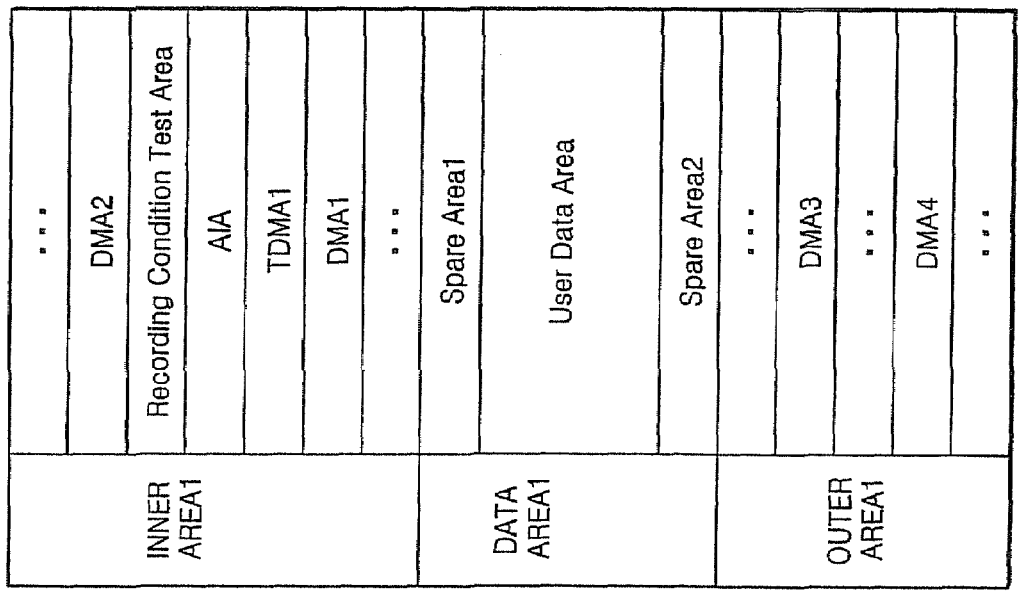

FIGS. 4A and 4B are detailed structures of the write-once disc having a double recording layer according to another embodiment of the present invention. FIG. 4A is a structure of a first recording layer L0, and FIG. 4B is a structure of a second recording layer L1. A TDMA1, a TDMA2, and a TDMA5 are allocated to the write-once disc having a double recording layer shown in FIGS. 4A and 4B. That is, besides the well known TDMA1 and TDMA2, only the TDMA5 is allocated to a second data area by a user or a recording apparatus and/or a reproducing apparatus when a disc initialization is performed to use the write-once disc having a double recording layer.

Areas, such as TDMAs allocated to a write-once disc, and a process of recording data in the areas will now be described.

A TDMA is an area where TDMS for management of the write-once disc is recorded before a finalization of the write-once disc. The finalization of the write-once disc is an operation preventing the write-once disc from being recorded again. When data cannot be recorded on the write-once disc any more by a selection of a user, or when data cannot additionally be recorded on the write-once disc, the write-once disc is finalized.

The TDMS includes a temporary defect list (TDFL), a TDDS, and a space bit map (SBM). The TDFL includes information indicating an area in which a defect is generated and information indicating a substitute area. The TDDS manages the TDFL and includes a location pointer indicating a location in which the TDFL is recorded, a location pointer indicating a location in which the SBM is recorded, information indicating locations and sizes of spare areas allocated to data areas, and information indicating locations and sizes of TDMAs allocated to the data areas. The SBM shows a data recording status of the write-once disc with a bit map by allocating different bit values to clusters in which data is recorded in cluster units, which are data recording units, and clusters in which data is not recorded.

When the write-once disc is loaded into the recording apparatus and/or the reproducing apparatus, a finally updated TDMS, in particular, the TDDS is quickly required to use the write-once disc in the apparatus.

Commonly, when the write-once disc is loaded into the recording apparatus and/or the reproducing apparatus, the same recording apparatus and/or the reproducing apparatus determines how to manage the write-once disc and how to record or reproduce data by reading information from the lead-in area and/or the lead-out area. If an amount of information recorded in the lead-in area and/or the lead-out area is large, more time is taken to prepare recording or reproducing after the write-once disc is loaded. Therefore, the TDMS is used, and the TDMS generated while data is recorded on or reproduced from the write-once disc is recorded in the TDMA, which is separated from a defect management area, and allocated to the lead-in area and/or the lead-out area.

When the write-once disc is finalized, the TDMS, i.e., the TDFL and the TDDS, recorded in the TDMA is finally recorded in a DMA since an information access to quickly use the write-once disc is possible by allowing the recording or reproducing apparatus to read only meaningful information from the defect management area by storing only final meaningful information among TDFLs and TDDs, which are updated and recorded several times, in the DMA.

Figure 5:
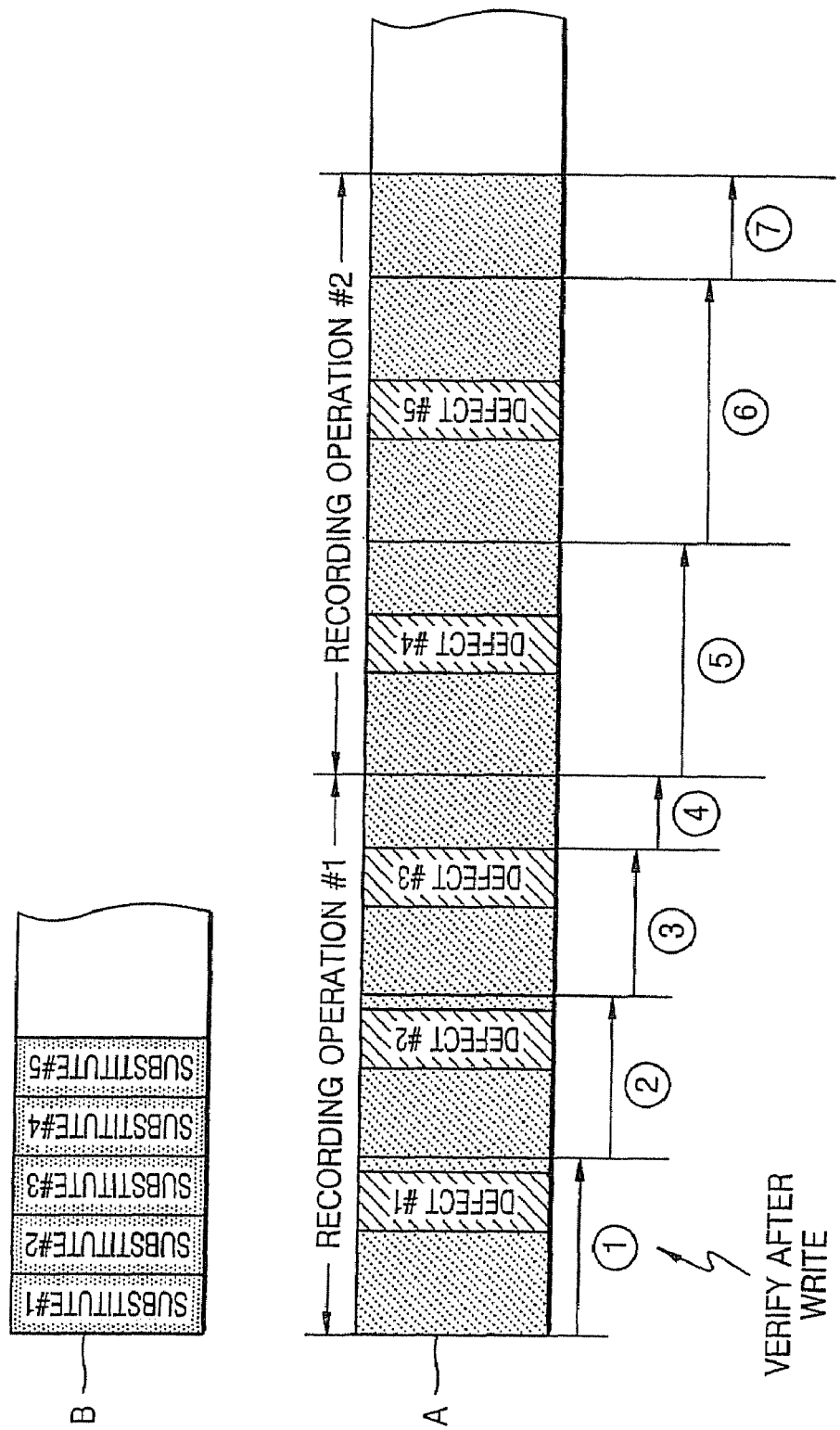
FIG. 5 illustrates a process of recording data in a user data area and a spare area according to an embodiment of the present invention.

FIG. 5 illustrates a process of recording data in a user data area and a spare area according to an embodiment of the present invention.

Referring to FIG. 5, A indicates the user data area, and B indicates the spare area. A method of recording user data in the user data area includes a continuous recording mode and a random recording mode. The user data is recorded continuously and sequentially in the continuous recording mode and randomly in the random recording mode. Zones ① through ⑦ indicate units in which verification after recording is performed.

A recording apparatus writes the user data in zone ① and verifies whether the user data has normally been written or a defect has been generated in zone ①. If a portion in which the defect has been generated is found, the portion is designated as a defect area, i.e., defect #1. Also, the recording apparatus rewrites the user data, which has been written in the defect #1, in the spare area. A portion in which the user data that has been written in the defect #1 is rewritten is called a substitute #1. The recording apparatus writes the user data in the zone ② and verifies whether the user data has normally been written or a defect has been generated in zone ②. If a portion in which the defect is generated is found, the portion is designated as a defect area, i.e., defect #2. Likewise, a substitute #2 corresponding to the defect #2 is generated. Also, in zone ③, a defect #3 and a substitute #3 are generated. In zone ④, a defect area does not exist since a portion in which a defect has been generated is not found.

If an end of a recording operation #1 is predicted after the user data is written and verified, that is, if a user pushes an eject button, or if recording of the user data allocated to a recording operation is finished, the recording apparatus writes information related to the defect #1, and the defect #2, and the defect #3, which are defect areas generated in the zones ① through ④, in the TDMA as a TDFL #1. Also, a management structure to manage the TDFL #1 is written in the TDMA as a TDDS #1. The recording operation is a work unit determined by an intention of the user or a desired recording work. In the present embodiment, the recording operation indicates a period from when the write-once disc is loaded and a recording work of predetermined information is performed to when the write-once disc is unloaded from the recording apparatus.

When the write-once disc is loaded again, a recording operation #2 starts, a recording condition in the recording condition test area is tested, and the user data is written on the basis of the test result. That is, in the recording operation #2, the user data is written in zones ⑤ through ⑦ in the same manner as recording operation #1, and a defect #4, a defect #5, a substitute #4, and a substitute #5 are generated. When the recording operation #2 ends, the recording apparatus writes information related to the defect #4 and the defect #5 in the TDMA as a TDFL #2. Also, a management structure to manage the TDFL #2 is written in the TDMA as a TDDS #2.

As shown in FIGS. 2 through 4, when a plurality of TDMAs and spare areas are allocated to the write-once disc, the TDMAs and spare areas are used in a predetermined order. For example, when a data write path applied to the write-once disc having a double recording layer shown in FIG. 3 is an opposite track path, i.e., a path where data is recorded from a first inner area of the first recording layer L0 to a first outer area of the first recording layer L0 and a second inner area of the second recording layer L1 to a second outer area of the second recording layer L1, data in the spare areas is recorded from a first spare area of the first recording layer L0. When the first spare area is full, a second spare area, a third spare area, and a fourth spare area are used in this order.

Likewise, the TDMS is recorded from the TDMA1 of the first recording layer L0. When the TDMA1 is full, an updated TDMS is recorded in the TDMA2 allocated to the second inner area of the second recording layer L1. When the TDMA2 is full, a newly updated TDMS is recorded in the TDMA3 allocated to a first data area of the first recording layer L0. In the present embodiment, the TDMA1 and the TDMA2 allocated to the inner areas of the recording layers are preferred for the write-once disc. However, the TDMA(s) allocated to the data areas may be or may not be allocated by a selection of the user. Therefore, when the TDMAs allocated to the inner areas of the recording layers are full, the TDMAs allocated to the data areas are used.

When a final updated TDMS is written in a TDMA allocated to a data area, a write-once disc is unloaded, and the write-once disc is reloaded into a recording apparatus, The recording apparatus must obtain the final updated TDMS to use the write-once disc. However, the TDMS is recorded in the TDMA allocated to the data area, and a disc drive cannot recognize the fact that the TDMS is recorded in the TDMA allocated to the data area until the disc drive accesses the TDDS included in the TDMS.

To solve this problem, an AIA is separately allocated to a predetermined location of the write-once disc in the present invention. Access information (AI) is recorded in the AIA. The AI indicates a location where update information such as the TDMS is recorded.

Also, the update information indicates information that a recording and/or reproducing apparatus must recognize to use a write-once disc in an initial period when the write-once disc is loaded into the recording and/or reproducing apparatus. Also, an area in which the update information is recorded is called an update area. In the present embodiment, a representative update information is the TDMS, and a representative update area is the TDMA.

As shown in FIGS. 2 through 4, the AIA is preferably, but not necessarily, allocated to a predetermined location of the lead-in area or an inner area. Also, the size of the AIA is preferably, but not necessarily, limited by minimizing an amount of AI recorded in the AIA and an AI update count since it takes longer to obtain the AI if the size of the AIA is larger or a plurality of AIAs are allocated.

Figure 6:
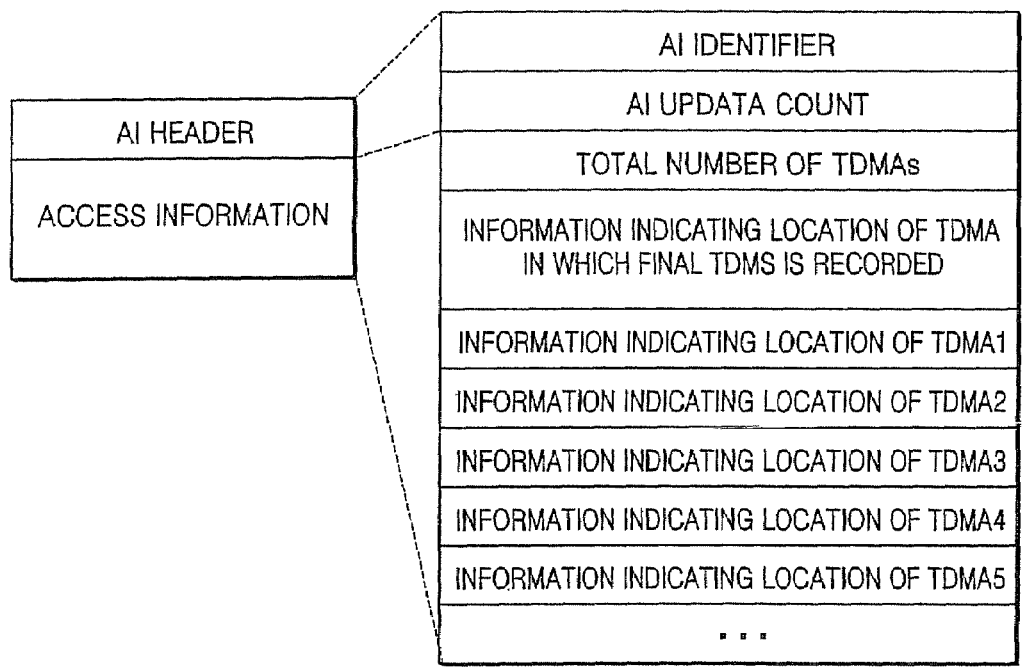
FIG. 6 is a data structure of access information according to a first embodiment of the present invention.

FIG. 6 is a data structure of access information (AI) according to a first embodiment of the present invention. The AI shown in FIG. 6 illustrates the TDMSs as update information, TDMAs as update areas, and the AI in the write-once disc having a double recording layer shown in FIG. 3.

Referring to FIG. 6, an AI header includes an AI identifier indicating that the following data is the AI and an AI update count showing an update count of the AI.

The AI includes a total number of TDMAs allocated to a write-once disc, information indicating a TDMA in which a final TDDS is recorded, and information indicating locations of the TDMAs. Each TDMA location information may include information indicating a beginning position and an ending position of each TDMA or information indicating a beginning or ending position and the size of each TDMA. Since the TDDS includes a pointer indicating a location of a corresponding TDFL, the AI includes information indicating the TDMA in which the final TDDS is recorded.

When a write-once disc according to the present invention is loaded into a disc drive, the disc drive can recognize a TDMA in which a final TDDS is recorded by accessing an AIA in an already known location and obtaining final updated AI and obtain a final TDDS from the TDMA. To minimize an access time to obtain the final AI recorded in the AIA, it is preferable, but not necessary, that AI is continuously recorded in the AIA at the continuous recording mode and the AI update count is minimized.

According to an embodiment of the present invention, to minimize the AI update count, the AI is updated whenever the TDMA in which the final TDDS is recorded is changed. Also, when information indicating the number of TDMAs allocated to the write-once disc and information indicating locations of the TDMAs are included in the AI, the AI is also updated when a new TDMA is allocated or the information indicating locations of the TDMAs is changed. Also, it is preferable, but not necessary, that the same AI is repeatedly recorded to prepare for when an error is generated in the recorded AI.

Since AI to be updated is continuously recorded after previous AI, even if information indicating a detailed address at which a final TDDS is recorded is not included in the AI, a recording apparatus and/or a reproducing apparatus can quickly seek a location in which the final TDDS is recorded by recognizing a border between a data recorded area and a data non-recorded area using a track jump method since a difference exists between an RF signal obtained from the data recorded area and an RF signal obtained from the data non-recorded area.

Figure 7:
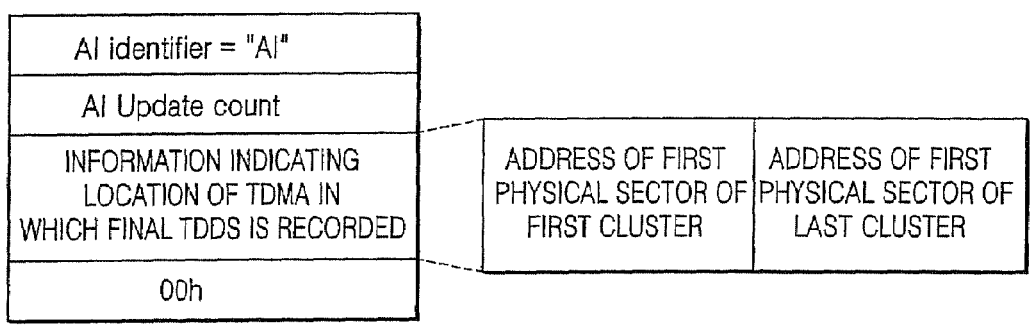
FIG. 7 is a data structure of access information according to a second embodiment of the present invention.

FIG. 7 is a data structure of AI according to a second embodiment of the present invention. The AI shown in FIG. 6 includes information indicating locations of all TDMAs and information indicating a TDMA in which a final TDDS is recorded. However, the AI shown in FIG. 7 includes information indicating a location of a TDMA in which a final TDDS is recorded. The information indicating the location of the TDMA in which the final TDDS is recorded can be represented as an address of a first physical sector of a first cluster of the TDMA and an address of a first physical sector of a last cluster of the TDMA. However, it will be understood by those of ordinary skill in the art that various changes in the method of representing the information indicating the location of the TDMA in which the final TDDS is recorded may be made therein without departing from the spirit and scope of the present invention.

Figure 8:
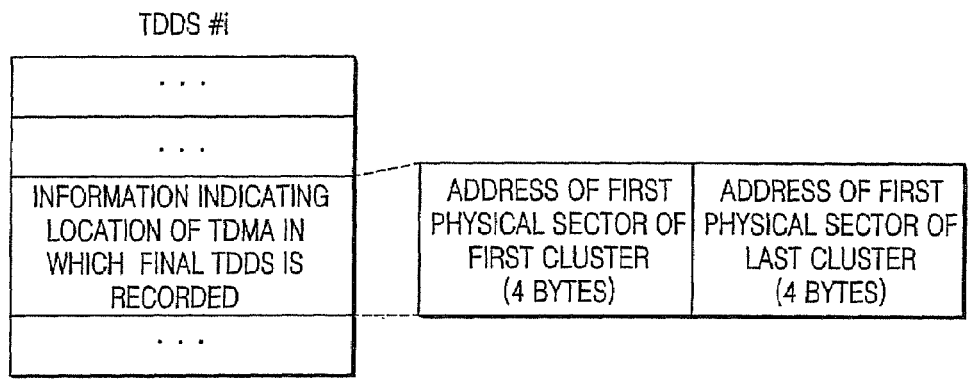
FIG. 8 is a data structure of access information according to a third embodiment of the present invention.

FIG. 8 is a data structure of AI according to a third embodiment of the present invention. The data structure of the AI shown in FIG. 8 is identical to a data structure of a TDDS. That is, the TDDS is used as the AI without defining a separate data structure of the AI. To use the TDDS as the AI, an information field indicating a location of a TDMA in which a final TDDS is recorded must be added to the TDDS.

Figure 9:
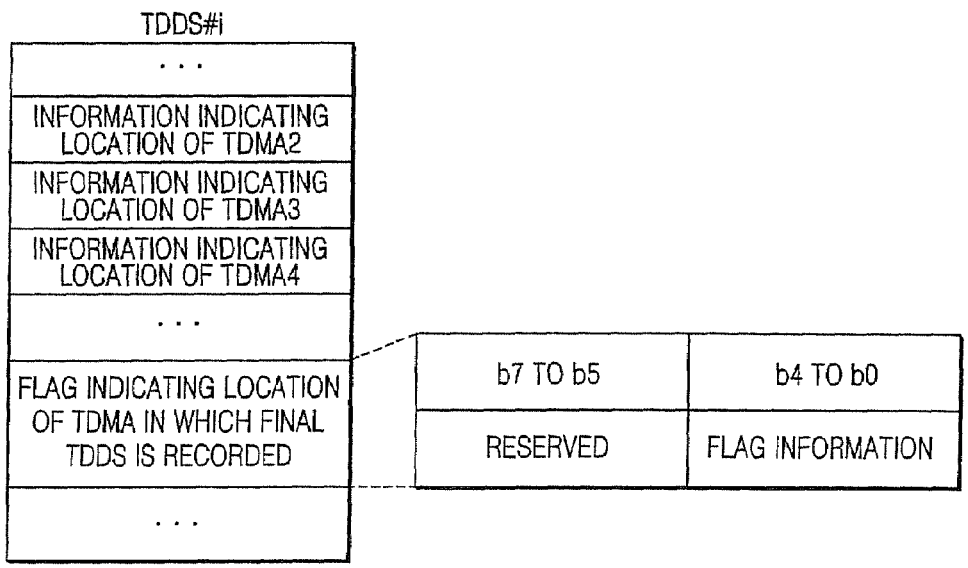
FIG. 9 is a data structure of access information according to a fourth embodiment of the present invention.

FIG. 9 is a data structure of AI according to a fourth embodiment of the present invention. The data structure of the AI shown in FIG. 9 is identical to a data structure of a TDDS as described in the third embodiment. However, unlike the third embodiment, a flag indicating a location of a TDMA in which a final TDDS is recorded is further included in the TDDS. In the present embodiment, the flag is made up of 8 bits, 5 bits, b0 through b4, indicating the TDMA in which the final TDDS is recorded and 3 bits, b5 through b7, being reserved bits. For example, it can be defined that the final TDDS is recorded in the TDMA1 when b0 trough b4 are "00001b", the TDMA2 when b0 trough b4 are "00010b", the TDMA3 when b0 trough b4 are "00100b", the TDMA4 when b0 trough b4 are "01000b", and the TDMA5 when b0 trough b4 are "10000b".

The plurality of TDMAs allocated to the write-once disc according to the present embodiments are continuously used on the basis of a data recording direction. Therefore, considering physically plural TDMAs as one consecutive TDMA, the one consecutive TDMA can be divided into a plurality of virtual TDMAs.

Figure 10:
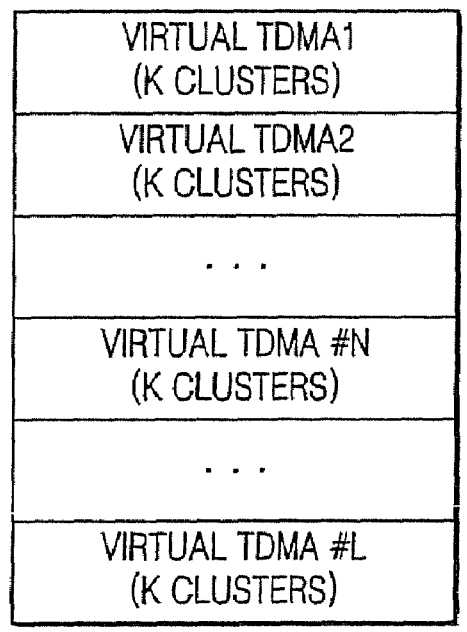
FIG. 10 is a data structure obtained by dividing an entire TDMA into a plurality of virtual TDMAs.

FIG. 10 is a data structure obtained by dividing an entire TDMA into a plurality of virtual TDMAs. For example, in the write-once disc having a double recording layer, when the TDMAs are used in the order of the TDMA1, the TDMA2, the TDMA3, the TDMA4, and the TDMA5, and if each of the TDMA1 and the TDMA2 includes 2048 clusters, each of the TDMA3 and the TDMA4 includes 4096 clusters, and the TDMA5 includes 8192 clusters, the entire TDMA includes 20480 clusters. If the entire TDMA is divided into 512-cluster units, 1024-cluster units, or 2048-cluster units, the entire TDMA can be divided into 40, 20, or 10 virtual TDMAs.

If the size of the TDMA3 among the TDMA1 through the TDMA5 allocated to the write-once disc is very large, and if a final TDDS is recorded in the TDMA3, a recording and/or reproducing apparatus recognizes the fact that the final TDDS is recorded in the TDMA3 from AI and obtains the final TDDS by seeking the TDMA3. However, when the size of the TDMA3 is very large, it can take a long time to seek the TDMA3 in order to obtain the final TDDS. Therefore, to solve this problem, a concept of the virtual TDMAs described above is used. The size of each virtual TDMA can be the same as shown in FIG. 10. However, the size of each virtual TDMA is not limited to the present embodiment.

The recording and/or reproducing apparatus divides the entire TDMA into the plurality of virtual TDMAs and updates the AI when a virtual TDMA in which the final TDDS is recorded is changed. Each of the data structures according to the first through fourth embodiments can be used as the data structure of the AI according to the present embodiment. However, the AI of the present embodiment includes information indicating a virtual TDMA in which the final TDDS is recorded or information indicating a location of the virtual TDMA in which the final TDDS is recorded.

Figure 11:
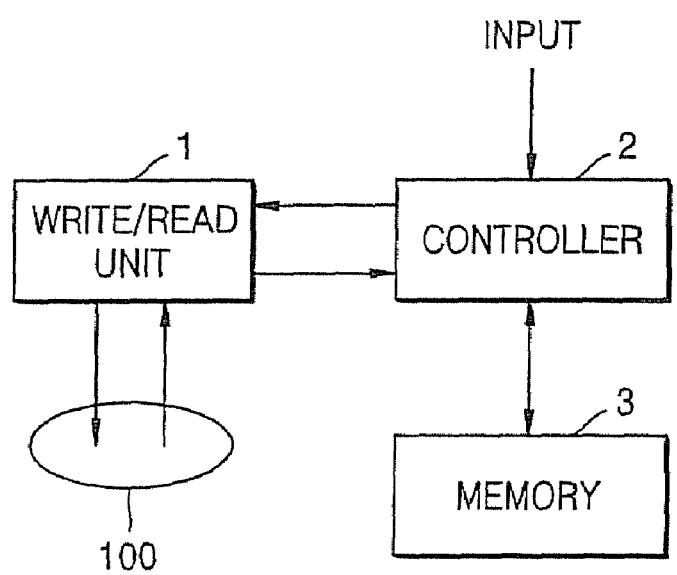
FIG. 11 is a block diagram of a recording apparatus according to an embodiment of the present invention.

FIG. 11 is a block diagram of a recording apparatus according to an embodiment of the present invention.

Referring to FIG. 11, the recording apparatus includes a write/read unit 1, a controller 2, and a memory 3. The write/read unit 1 writes data on a write-once disc 100 and reads the recorded data to verify whether a defect exists in the recorded data. An AIA according to the present invention is allocated to the write-once disc 100.

To manage the defect, the controller 2 uses a verify after write method of detecting a portion in which a defect is generated by writing data in predetermined units and verifying the recorded data. The controller 2 checks where defects are generated by writing and verifying user data in each recording operation unit, generates a defect list indicating where defect areas exist as the checking results, stores the generated defect list in the memory 3, gathers a plurality of defect lists, stores the plurality of defect lists in an update area allocated to the write-once disc 100, i.e., a TDMA, as a TDFL, and further writes a TDDS for managing the recorded TDFL in the TDMA. During one recording operation, a verify after write work is performed at least once, and commonly, several times. A defect list obtained by performing the verify after write work is temporarily stored in the memory 3 as a TDFL. When the recording operation finishes, the controller 2 reads the TDFL stored in the memory 3, provides the TDFL to the write/read unit 1, and commands the write/read unit 1 to write the TDFL in the TDMA allocated to the write-once disc 100.

When data cannot be recorded on the write-once disc 100 any more, or when a user does not desire to write data in a data area any more (when the write-once disc 100 is finalized), the controller 2 writes the TDFL and the TDDS recorded in the TDMA in a DMA allocated to the write-once disc 100.

The controller 2 controls the write/read unit 1 to write data having a data structure according to the present invention. That is, the controller 2 controls the write/read unit 1 to write predetermined update information, i.e., a TDMS including a TDFL or a TDDS, in one of a plurality of update areas allocated to the write-once disc 100 and write update AI in an AIA allocated to the write-once disc 100 when it is necessary to update the AI.

A method of recording AI according to an aspect of the present invention will now be described in detail on the basis of the structure of the recording apparatus described above.

Figure 12:
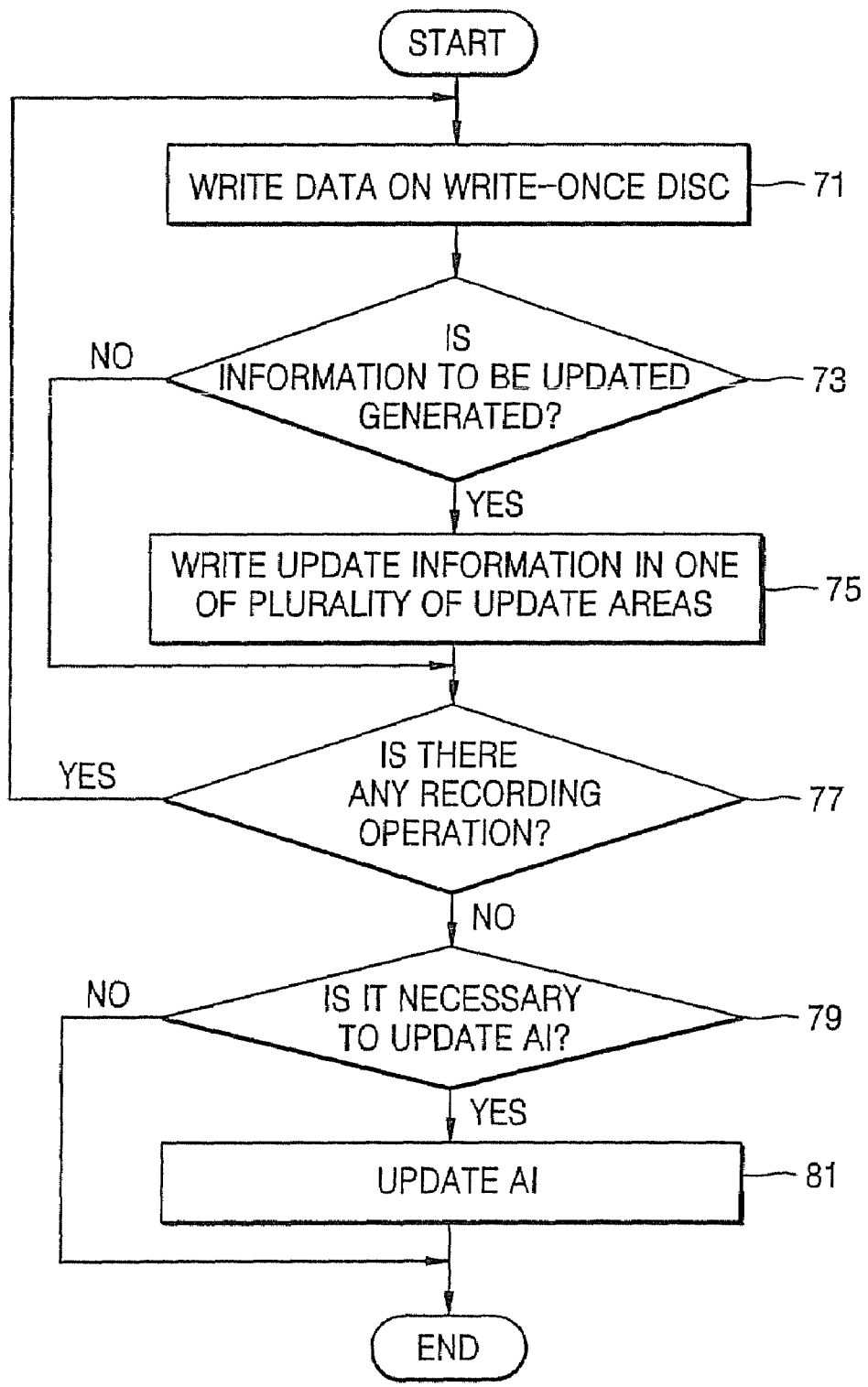
FIG. 12 is a flowchart illustrating a recording method according to an embodiment of the present invention.

FIG. 12 is a flowchart illustrating a recording method according to an embodiment of the present invention.

When the write-once disc 100 is loaded into the recording apparatus, the controller 2 controls the write/read unit 1 to write predetermined user data on the write-once disc 100 in operation 71.

It is determined whether information to be updated is generated as a result of performing a verify after write work, which is performed at least once during one recording operation in operation 73. In the present embodiment, the information to be updated indicates a TDMS. When the TDMS is generated, the TDMS is temporarily stored in the memory 3, and when the recording operation is finished, the controller 2 reads a TDFL stored in the memory 3 and provides the TDFL to the write/read unit 1, and the write/read unit 1 writes the TDFL in one of a plurality of update areas allocated to the write-once disc 100 in operation 75. In the present embodiment, the update area indicates a TDMA.

The controller 2 determines whether another recording operation exists in operation 77, and if another recording operation exists, operations 71 through 77 are repeated.

If another recording operation does not exist, the controller 2 determines whether it is necessary to update AI in operation 79. In the present embodiment, when a TDMA in which a final TDMS, and in particular a final TDDS, is recorded is changed, when a new TDMA is allocated, or when information indicating a location of an existing TDMA is changed, the AI is updated.

The controller 2 controls the write/read unit 1 to write the AI indicating an update area in which final updated information is recorded among a plurality of update areas in an AIA at least one of which is allocated to the write-once disc 100 in operation 81. It is preferable, but not necessary, that the same AI is repeatedly recorded in the event an error is generated in the recorded AI.

As described above, if AI indicating a location in which a final TDMS is recorded is recorded in an AIA of the write-once disc 100, when the write-once disc 100 is loaded into a recording apparatus or a reproducing apparatus again, the recording apparatus or the reproducing apparatus can access a final TDDS more quickly and easily.

An apparatus (not shown) for reproducing the write-once disc 100 including an AIA in which AI according to the present invention is recorded has a similar structure to the recording apparatus shown in FIG. 11. However, since it is a reproducing apparatus, a reader is included instead of the write/read unit 1. When the write-once disc 100 including the AIA in which the AI is recorded, is loaded into the reproducing apparatus, the reproducing apparatus determines whether the write-once disc 100 is finalized by accessing a DMA and determining whether data is recorded in the DMA. If the write-once disc 100 is not finalized, the reproducing apparatus accesses the AIA and obtains final AI. The recording apparatus or the reproducing apparatus recognizes the TDMA in which the final TDDS is recorded from the final AI. Operations of the reproducing apparatus according to the present invention can be easily understood by those skilled in the art from the description of the write-once disc 100 including the AIA and the recording apparatus therefor.

If the write-once disc 100 is a blank disc which is not initialized, data is not recorded in the AIA at all. The recording apparatus performs initialization to use the write-once disc 100. When the write-once disc 100 is initialized, first AI having a data structure according to various embodiments as described above is recorded in a first recording cluster of the AIA As described above, according to an embodiment of the present invention, an access time for reading updated information can be reduced when a write-once disc on which predetermined information is updated and recorded in a new location is used. Also, when a plurality of update areas for writing updated information required to use the write-once disc exist, a recording apparatus or a reproducing apparatus can quickly and easily determine an update area in which finally updated information is recorded among the plurality of update areas.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recording data on a write-once disc, the method comprising:

recording temporary defect list (TDFL) and temporary disc defect structure (TDDS) in a plurality of temporary defect management areas allocated to the write-once disc, the temporary defect list comprising information on defect areas, and the temporary disc defect structure comprising a location pointer indicating a location in which the temporary defect list is recorded; and recording access information in at least one access information area allocated to the write-once disc, the access information indicating a temporary defect management area in which latest temporary defect list and temporary disc defect structure are recorded, among the plurality of temporary defect management areas, wherein the access information is updated in the access information area when the temporary defect management area in which the latest temporary defect list and temporary disc defect structure are recorded, is changed.

2. The method of claim 1, wherein the access information includes at least one of the plurality of temporary defect management areas or information indicating locations of the at least one of the plurality of temporary defect management areas.

3. The method of claim 2, wherein the information indicating locations of the at least one of the plurality of temporary defect management areas includes a beginning position and an ending position of each temporary defect management area.

4. The method of claim 2, wherein the information indicating locations of the at least one of the plurality of temporary defect management areas includes a beginning position and a size of each temporary defect management area.

5. The method of claim 2, wherein the information indicating the locations of the at least one of the plurality of temporary defect management areas includes an ending position and a size of each temporary defect management area.

6. The method of claim 1, wherein the recording of the access information comprises:

recording updated access information indicating a changed temporary defect management area only when one of the plurality of temporary defect management areas, in which the latest temporary defect list and temporary disc defect structure is recorded, is changed.

7. The method of claim 2, wherein the recording of the access information comprises:

recording the access information including the at least one of the temporary defect management areas changed or the information indicating the location of an added temporary defect management area when a new temporary defect management area is added to the write-once disc.

8. The method of claim 2, wherein the recording of the access information comprises:

recording the access information including the information indicating a changed location when information indicating the location of the at least one of the plurality of temporary defect management areas is changed.

9. The method of claim 1, wherein the recording of the access information comprises:

repeatedly recording the access information in the access information area.

10. The method of claim 1, wherein the access information is a flag indicating the temporary defect management area in which the latest temporary defect list and temporary disc defect structure is recorded.

11. The method of claim 1, wherein the plurality of temporary defect management areas are physical areas.

12. The method of claim 1, wherein the plurality of temporary defect management areas are obtained by logically dividing a plurality of physical areas.

13. The method of claim 1, wherein the write-once disc has a single recording layer including a lead-in area, a data area, and a lead-out area, and at least one access information area is allocated to the lead-in area or the lead-out area.

14. The method of claim 1, wherein the write-once disc has a double recording layer, each recording layer including an inner area, a data area, and an outer area, and at least one access information area is allocated to the inner areas or the outer areas.

15. A method of reproducing a write-once disc comprising a plurality of temporary defect management areas in which temporary defect list (TDFL) and temporary disc defect structure (TDDS) are recorded, the method comprising:

obtaining access information from at least one access information area allocated to the write-once disc, the access information indicating an temporary defect management area in which latest temporary defect list and temporary disc defect structure are recorded, among a plurality of temporary defect management areas; and obtaining the latest temporary defect list and temporary disc defect structure based on the access information, the temporary defect list comprising information on defect areas, and the temporary disc defect structure comprising a location pointer indicating a location in which the temporary defect list is recorded, wherein the access information is updated in the access information area when the temporary defect management area in which the latest temporary defect list and temporary disc defect structure are recorded, is changed.

16. The method of claim 15, wherein the access information includes the plurality of temporary defect management areas.

17. The method of claim 15, wherein the access information includes information indicating a location of the temporary defect management area in which the latest temporary defect list and temporary disc defect structure is recorded.

18. The method of claim 17, wherein the information indicating the location of the temporary defect management area in which the latest temporary defect list and temporary disc defect structure is recorded includes a beginning position and an ending position of the temporary defect management area.

19. The method of claim 15, wherein the plurality of temporary defect management areas are physical areas.

20. The method of claim 15, wherein the plurality of temporary defect management areas are obtained by logically dividing a plurality of physical areas.

* * * * *